US010387780B2

(12) United States Patent
Adair et al.

(10) Patent No.: US 10,387,780 B2
(45) Date of Patent: Aug. 20, 2019

(54) CONTEXT ACCUMULATION BASED ON PROPERTIES OF ENTITY FEATURES

(75) Inventors: Gregery G. Adair, Henderson, NV (US); Robert J. Butcher, Las Vegas, NV (US); Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 13/585,066

(22) Filed: Aug. 14, 2012

(65) Prior Publication Data
US 2014/0052685 A1 Feb. 20, 2014

(51) Int. Cl.
*G06N 5/02* (2006.01)

(52) U.S. Cl.
CPC ...................................... *G06N 5/02* (2013.01)

(58) Field of Classification Search
None
See application file for complete search history.

(56) References Cited

U.S. PATENT DOCUMENTS

| 4,773,861 | A | 9/1988 | Dufour |
| 5,895,465 | A | 4/1999 | Guha |
| 5,991,758 | A | 11/1999 | Ellard |
| 6,943,724 | B1 | 9/2005 | Brace et al. |
| 7,096,259 | B1 | 8/2006 | Gray et al. |
| 7,366,632 | B2 | 4/2008 | Hamann et al. |
| 7,373,246 | B2 | 5/2008 | O'Clair |
| 7,707,122 | B2 | 4/2010 | Hull et al. |
| 7,926,111 | B2 | 4/2011 | Oliver et al. |
| 7,966,291 | B1 | 6/2011 | Petrovic et al. |
| 8,015,137 | B2 | 9/2011 | Allen et al. |

(Continued)

FOREIGN PATENT DOCUMENTS

| CN | 102567439 A | 7/2012 |
| CN | 102568035 A | 7/2012 |

(Continued)

OTHER PUBLICATIONS

Whang, Steven Euijong, and Hector Garcia-Molina. "Entity resolution with evolving rules." Proceedings of the VLDB Endowment 3.1-2 (2010): 1326-1337. [Online] <retrieved Jul. 22, 2014> <http://vldb2010.org/proceedings/files/papers/R117.pdf>.*

(Continued)

*Primary Examiner* — Scott A. Waldron
*Assistant Examiner* — Kevin W Figueroa
(74) *Attorney, Agent, or Firm* — Janaki K. Davda; Konrad, Raynes, Davda and Victor LLP

(57) ABSTRACT

According to one embodiment of the present invention, a system for determining related entities includes at least one processor. The system identifies one or more candidate entities for a data object associated with an entity based on one or more features. The entity and candidate entities are each associated with one or more features and each feature is associated with one or more behaviors. The identified candidate entities related to the entity are determined based on the associated behaviors of the features of the identified candidate entities and the entity. Embodiments of the present invention further include a method and computer program product for determining related entities in substantially the same manner described above.

15 Claims, 3 Drawing Sheets

(56) References Cited

U.S. PATENT DOCUMENTS

| | | |
|---|---|---|
| 8,204,213 B2 | 6/2012 | Hunt et al. |
| 8,229,766 B2 | 7/2012 | Carttar et al. |
| 8,244,502 B2 | 8/2012 | Hamann et al. |
| 8,306,794 B2 | 11/2012 | Hamann et al. |
| 8,514,226 B2 | 8/2013 | Zafar et al. |
| 8,606,721 B1 | 12/2013 | Dicker |
| 9,230,258 B2 | 1/2016 | Adair et al. |
| 9,270,451 B2 | 2/2016 | Jonas et al. |
| 9,332,032 B2 | 5/2016 | Dunne et al. |
| 9,338,001 B2 | 5/2016 | Jonas et al. |
| 9,525,969 B2 | 12/2016 | Evans et al. |
| 9,525,970 B2 | 12/2016 | Farley et al. |
| 9,615,371 B1 | 4/2017 | de Barros Chapiewski |
| 10,122,805 B2 | 11/2018 | Krauss |
| 2002/0095319 A1 | 7/2002 | Swart et al. |
| 2003/0130987 A1 | 7/2003 | Edlund et al. |
| 2004/0203868 A1 | 10/2004 | Eidson |
| 2004/0210763 A1 | 10/2004 | Jonas |
| 2007/0067285 A1 | 3/2007 | Blume et al. |
| 2007/0132767 A1 | 6/2007 | Wright et al. |
| 2008/0033933 A1 | 2/2008 | Cookson et al. |
| 2008/0098008 A1 | 4/2008 | Eid |
| 2008/0120271 A1 | 5/2008 | Hunt et al. |
| 2008/0125969 A1 | 5/2008 | Chen et al. |
| 2008/0243885 A1 | 10/2008 | Harger et al. |
| 2008/0288193 A1 | 11/2008 | Claassen et al. |
| 2009/0006349 A1 | 1/2009 | Fuxman et al. |
| 2009/0012898 A1 | 1/2009 | Sharma et al. |
| 2009/0055719 A1 | 2/2009 | Cossins et al. |
| 2009/0077113 A1 | 3/2009 | Fidaali et al. |
| 2009/0106242 A1 | 4/2009 | McGrew et al. |
| 2009/0157593 A1 | 6/2009 | Hayashi et al. |
| 2009/0164811 A1 | 6/2009 | Sharma et al. |
| 2009/0234869 A1 | 9/2009 | Azvine et al. |
| 2009/0239467 A1 | 9/2009 | Gulin et al. |
| 2009/0248687 A1 | 10/2009 | Su et al. |
| 2009/0248738 A1 | 10/2009 | Martinez et al. |
| 2009/0265106 A1 | 10/2009 | Bearman et al. |
| 2009/0326879 A1 | 12/2009 | Hamann et al. |
| 2009/0326884 A1 | 12/2009 | Amemiya et al. |
| 2010/0197318 A1 | 8/2010 | Petersen et al. |
| 2011/0040532 A1 | 2/2011 | Hamann et al. |
| 2011/0060561 A1 | 3/2011 | Lugo et al. |
| 2011/0087495 A1 | 4/2011 | O'Neill et al. |
| 2011/0246494 A1 | 10/2011 | Adair et al. |
| 2011/0302128 A1 | 12/2011 | Hayashi et al. |
| 2012/0029956 A1 | 2/2012 | Ghosh et al. |
| 2012/0084859 A1 | 4/2012 | Radinsky et al. |
| 2012/0089859 A1 | 4/2012 | Wang et al. |
| 2012/0106738 A1 | 5/2012 | Belenkiy et al. |
| 2012/0166347 A1 | 6/2012 | Lacal |
| 2012/0226889 A1 | 9/2012 | Merriman et al. |
| 2012/0320815 A1 | 12/2012 | Massena |
| 2013/0282811 A1 | 10/2013 | Lessin et al. |
| 2014/0006377 A1 | 1/2014 | Astore |
| 2014/0019544 A1 | 1/2014 | Palmert |
| 2014/0123300 A1 | 5/2014 | Jung et al. |
| 2014/0141720 A1 | 5/2014 | Princen et al. |
| 2014/0257740 A1 | 9/2014 | Hamann et al. |
| 2014/0270482 A1 | 9/2014 | Chakraborty et al. |
| 2014/0306833 A1 | 10/2014 | Ricci |
| 2014/0309789 A1 | 10/2014 | Ricci |
| 2015/0098565 A1 | 4/2015 | Jonas et al. |
| 2015/0101061 A1 | 4/2015 | Jonas et al. |
| 2015/0356257 A1 | 12/2015 | Wright et al. |

FOREIGN PATENT DOCUMENTS

| | | |
|---|---|---|
| EP | 2652887 | 6/2014 |
| JP | 2010237832 A | 10/2010 |
| WO | 2010065429 | 6/2010 |
| WO | 2012082722 | 6/2012 |

OTHER PUBLICATIONS

Whang, Steven Euijong, Omar Benjelloun, and Hector Garcia-Molina. "Generic entity resolution with negative rules." The VLDB Journal—The International Journal on Very Large Data Bases 18.6 (2009): 1261-1277. [Online] <retrieved Jul. 22, 2014> <http://swhig.web.unc.edu/files/2011/10/negativerules.pdf>.*

Singla, Parag, and Pedro Domingos. "Entity resolution with markov logic." Data Mining, 2006. ICDM'06. Sixth International Conference on. IEEE, 2006. [Online] <retrieved Jul. 22, 2014> <http://www.cse.iitd.ac.in/~parags/papers/erml-icdm06.pdf>.*

Whang, Steven Euijong, Omar Benjelloun, and Hector Garcia-Molina. "Generic entity resolution with negative rules." The VLDB Journal 18.6 (2009): 1261. (Year: 2009).*

Benjelloun, Omar, et al. "Swoosh: a generic approach to entity resolution." The VLDB Journal—The International Journal on Very Large Data Bases 18.1 (2009): 255-276. (Year: 2009).*

Jeff Jonas, "Entity Resolution Systems vs. Match Merge/Merge Purge/List-De-duplication Systems", http://jeffjonas.typepad.com/jeff_jonas/2007/09/entity-resoluti.html, Sep. 25, 2007, retrieved from the internet on Nov. 20, 2009, 5 pages.

Dey et al., "A distance-based approach to entity reconciliation in heterogeneous databases," Knowledge and Data Engineering, IEEE Transactions on Knowledge and Data Engineering, vol. 14, No. 3, pp. 567-582, May/Jun. 2002.

Christen et al., "Towards Scalable Real-Time Entity Resolution Using a Similarity-Aware Inverted Index Approach", 2008, Australian Computer Society, Inc., 10 pages.

Jonas, J., "Threat and Fraud Intelligence, Las Vegas Style", 2006 IEEE, 8 pages.

Kang et al., "Interative Entity Resolution in Relational Data: A Visual Analytic Tool and its Evaluation", IEEE Trans. on vol. 14, No. 5, Sep.-Oct. 2008, pp. 999-1014.

Malin et al., "A Semantic Framework for Entity Resolution Modelling", School of Computer Science, Carnegie Mellon University, Nov. 2005, 18 pages.

Sheth et al., "Traveling the Semantic Web Through Space, Time, and Theme", 2008 IEEE, IEEE Internet Computing, vol. 12, Iss. 2, Mar.-Apr. 2008, pp. 81-86.

Amendment 1, Jul. 16, 2012, for U.S. Appl. No. 12/752,386, filed Apr. 1, 2010 by G.G. Adair et al., Total 14 pp.

Amendment 2, Dec. 10, 2012, for U.S. Appl. No. 12/752,386, filed Apr. 1, 2010 by G.G. Adair et al., Total 15 pp.

Final Office Action 1, Sep. 10, 2012, for U.S. Appl. No. 12/752,386, filed Apr. 1, 2010 by G.G. Adair et al., Total 20 pp.

Office Action 1, Mar. 28, 2012, for U.S. Appl. No. 12/752,386, filed Apr. 1, 2010 by G.G. Adair et al., Total 19 pp.

English Abstract for CN102567439A, published on Jul. 11, 2012, Total 1 p.

English Abstract for CN102568035A, published on Jul. 11, 2012, Total 1 p.

ISEBOX. © 2010 HumanGeo, LLC: <http://www.thehumangeo.com/solutions_isebox.php>: Downloaded Apr. 9, 2013. pp. 1-2.

Preliminary Amendment, Jun. 23, 2014, for U.S. Appl. No. 14/045,718, filed Oct. 3, 2013 by J.J. Jonas et al., Total 5 pp.

Preliminary Amendment, Jun. 23, 2014, for U.S. Appl. No. 14/312,085, filed Jun. 23, 2014 by J.J. Jonas et al., Total 6 pp.

Pugh, William: "Skip Lists: A Probabilistic Alternative to Balanced Trees": Communications of the ACM: vol. 33 Issue 6. New York, NY. Jun. 1990, Total 8 pp.

U.S. Appl. No. 14/045,718, filed Oct. 3, 2013, entitled "Privacy Enhanced Spatial Analytics", invented by J.J. Jonas et al., Total 49 pp.

U.S. Appl. No. 14/312,085, filed Jun. 23, 2014, entitled "Privacy Enhanced Spatial Analytics", invented by J.J. Jonas et al., Total 49 pp.

Whitney, Bill: "Skip Lists in C++": Dr. Dobb's the World of Software Development. Nov. 1, 1998. URL:http://www.drdobbs.com/cpp/skip-lists-in-c/184403579. Downloaded Apr. 9, 2013. pp. 1-12.

Wikipedia, "Circle of Latitude", [online], [Retrieved on Jul. 24, 2013]. Retrieved from the Internet at <URL: en.wikipedia.org/wiki/Circle_of_latitude>, Total 7 pp.

(56) References Cited

OTHER PUBLICATIONS

Wikipedia, "Geohash'" [online], [Retrieved on Apr. 9, 2013]. Retrieved from the Internet at <URL: http://en.wikipedia.org/wiki/Geohash>, Total 6 pp.
Zhang, Jie. Dissertation: "Spatio-Temporal Aggregates over Streaming Geospatial Image Data": Jun. 2007. <http://www.cs.ucdavis.edu/research/tech-reports/2007/CSE-2007-29.pdf> Downloaded Apr. 9, 2013. pp. 1-145.
Office Action, dated Apr. 30, 2014, for U.S. Appl. No. 12/752,386, filed Apr. 1, 2010, invented by Gregery Adair et al., Total 15 pages.
Response to Office Action, dated Jul. 30, 2014, for U.S. Appl. No. 12/752,386, filed Apr. 1, 2010, invented by Gregery Adair et al., Total 13 pages.
International Search Report, dated Dec. 2, 2014, for PCT/JP2014/004558, Total 2 pp.
International Search Report and Written Opinion, dated Dec. 2, 2014, for PCT/JP2014/004558, Total 2 pp.
English Abstract and Machine Translation for JP2010237832A, published Oct. 21, 2010, Total 27 pp.
Notice of Allowance, dated Nov. 28, 2014, for U.S. Appl. No. 12/752,386, filed Apr. 1, 2010, invented by Gregery Adair et al., Total 16 pages.
Office Action, dated Dec. 18, 2014, for U.S. Appl. No. 14/045,718, filed Oct. 3, 2013, invented by Jeffrey J. Jonas et al., Total 21 pages.
Maludrottu, S., M. Beoldo, M. Soto Alvarez, and C. Regazzoni, "A Bayesian Framework for Online Interaction Classification", 2010 Seventh IEEE International Conference on Advanced Video and Signal Based Surveillance, © 2010 IEEE, Total 6 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institute of Standards and Technology, Total 7 pp.
Moussa, W.A., J. Jessel, and E. Dubois, "Notational-based Prototyping of Mixed Interactions", In Proceedings of the 5th IEEE and ACM International Symposium on Mixed and Augmented Reality, © 2006 IEEE, Total 2 pp.
Wikipedia, "Vincenty's Formulae", [online], [Retrieved on Jun. 29, 2015]. Retrieved from the Internet at <URL: https://en.wikipedia.org/wiki/Vincenty%27s_formulae>, page last modified on Apr. 22, 2015, Total 5 pp.
Notice of Allowance, May 18, 2015, for U.S. Appl. No. 12/752,386, filed Apr. 1, 2010 by G.G. Adair et al., Total 11 pp.
Response to Office Action 1, Mar. 30, 2015, for U.S. Appl. No. 14/045,718, filed Oct. 3, 2013 by J.J. Jonas et al., Total 9 pp.
English Abstract for EP2652887, published on Jun. 25, 2014, Total 2 pp.
US Patent Application, dated Jun. 30, 2015, for U.S. Appl. No. 14/788,185, filed Jun. 30, 2015, by Kirk K. Krauss et al., Total 43 pp.
Final Office Action, dated Jul. 14, 2015, for U.S. Appl. No. 14/045,718, filed Oct. 3, 2013 by J.J. Jonas et al., Total 19 pp.
Office Action, dated Aug. 10, 2015, for U.S. Appl. No. 14/312,085, filed Jun. 23, 2014 by J.J. Jonas et al., Total 35 pp.
Written Opinion, dated Dec. 2, 2014, for International Application No. PCT/JP2014/004558, Total 5 pp.
Notice of Allowance, dated Aug. 26, 2015 for U.S. Appl. No. 12/752,386, filed Apr. 1, 2010, invented by Gregery G. Adair et al., Total 11 pages.
Response to Final Office Action, dated Sep. 21, 2015, for U.S. Appl. No. 14/045,718, filed Oct. 3, 2013, invented by Jeffrey J. Jonas et. al., Total 11 pages.
Response to Office Action, dated Sep. 21, 2015, for U.S. Appl. No. 14/312,085, filed Jun. 23, 2013, invented by Jeffrey J. Jonas et. al., Total 8 pages.
Notice of Allowance, dated Nov. 6, 2015, for U.S. Appl. No. 14/045,718 filed Oct. 3, 2013, invented by Jeffrey J. Jonas et. al., Total 14 pages.
Final Office Action, dated Nov. 13, 2015 for U.S. Appl. No. 14/312,085, filed Jun. 23, 2013, invented by Jeffrey J. Jonas et. al., Total 16 pages.
Response to Final Office Action, dated Jan. 13, 2016, for U.S. Appl. No. 14/312,085, filed Jun. 23, 2013, invented by Jeffrey J. Jonas et. al., Total 6 pages.
Notice of Allowance, dated Feb. 4, 2016, for U.S. Appl. No. 14/312,085, filed Jun. 23, 2013, invented by Jeffrey J. Jonas et. al., Total 11 pages.
Office Action, dated Dec. 30, 2016, for U.S. Appl. No. 14/788,185, filed Jun. 30, 2015, invented by K.J. Krauss et al., Total 38 pages.
Response to Office Action, dated Mar. 30, 2017, for U.S. Appl. No. 14/788,185, filed Jun. 30, 2015, invented by K.J. Krauss et al., Total 20 pages.
Response to Final Office Action, dated Aug. 26, 2017, for U.S. Appl. No. 14/788,185, filed Jun. 30, 2015, invented by K.J. Krauss et al., Total 21 pages.
Final Office Action, dated May 26, 2017, for U.S. Appl. No. 14/788,185, filed Jun. 30, 2015, invented by K.J. Krauss et al., Total 33 pages.
Office Action, dated Oct. 2, 2017 for U.S. Appl. No. 14/788,185, filed Jun. 30, 2015, invented by K.J. Krauss et al., Total 27 pages.
Response to Office Action, dated Jan. 2, 2018 for U.S. Appl. No. 14/788,185, filed Jun. 30, 2015, invented by K.J. Krauss et al., Total 17 pages.
Final Office Action, dated Jan. 24, 2018, for U.S. Appl. No. 14/788,185, filed Jun. 30, 2015, invented by K.J. Krauss et al., Total 20 pages.
Response to Office Action, dated Apr. 17,2018, U.S. Appl. No. 14/788,185, filed Jun. 30, 2015, invented by K.J. Krauss et al., Total 17 pages.
Notice of Allowance, dated Jun. 22, 2018, for U.S. Appl. No. 14/788,185, filed Jun. 30, 2015, invented by K.J. Krauss et al., Total 24 pages.
Corrected Notice of Allowability, Jul. 5, 2018, for U.S. Appl. No. 14/788,185, filed Jun. 30, 2015, invented by K.J. Krauss et al., Total 17 pages.

* cited by examiner

CONTEXT ACCUMULATION BASED ON PROPERTIES OF ENTITY FEATURES

BACKGROUND

1. Technical Field

Present invention embodiments relate to context accumulation, and more specifically, to determining data associated with the same entity based on properties or behaviors of entity features.

2. Discussion of the Related Art

Entity resolution may be used to determine data associated with the same entity (e.g., person, animal, business, object, etc.). For example, two or more customer records may contain slightly different data (e.g., first names of Bill and William), but still be associated with the same person or entity. An entity may include various features or characteristics (e.g., name, address, date of birth, etc.). The entity features may be used to determine a confidence or score indicating a degree of certainty that different data records are associated with the same entity.

Entity resolution may be utilized within a single data source or across plural data sources to identify duplicate data records and/or associate data records with a common entity. Systems performing entity resolution and relationship discovery use feature-specific rules. In these types of systems, a series of new rules is introduced in response to adding a new identifying feature for an entity. For example, after a new identifying feature pertaining to loyalty club number is added for a person entity, a skilled user introduces a series of new rules indicating the manner in which the new loyalty card number feature is weighed for entity resolution (in conjunction with other entity features). However, the quantity of new rules for these systems rapidly becomes unmanageable as additional entity types (e.g., person, animal, business, object, etc.) and features are introduced.

BRIEF SUMMARY

According to one embodiment of the present invention, a system for determining related entities includes at least one processor. The system identifies one or more candidate entities for a data object associated with an entity based on one or more features. The entity and candidate entities are each associated with one or more features and each feature is associated with one or more behaviors. The identified candidate entities related to the entity are determined based on the associated behaviors of the features of the identified candidate entities and the entity. Embodiments of the present invention further include a method and computer program product for determining related entities in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments employ a context accumulation technique to associate data, where the technique understands the manner in which each portion of data relates to other associated data portions. The context accumulation technique includes entity resolution, relationship awareness (or the manner in which discreet entities are related), and self-correcting aspects with respect to new entity features or observations.

The context accumulation technique of present invention embodiments enables users to introduce new entity types and features without modification of rules. For example, a system of a present invention embodiment employing context accumulation may, with the exact same system configuration, perform analytics with respect to records for marketing, may be used to handle maritime security entities (e.g., vessels), and may be used to handle cyber-security intrusion entities (e.g., routers, mobile devices, etc.). In other words, present invention embodiments enable use of universal rules for performing context accumulation type tasks independent of the entities and/or data sets.

An entity (e.g., person, animal, business, object, etc.) may include various features or characteristics (e.g., with values that are collected or observed). The entity features further include properties or behaviors. For example, a car entity may include features or characteristics of a make, model, license plate, and vehicle identification number (VIN), while the properties or behaviors for the vehicle identification number (VIN) may include frequency (e.g., a VIN is assigned to one car), exclusivity (e.g., a car has only one VIN), and stability (e.g., a VIN is stable (unchanged) over the lifetime of a car). Present invention embodiments employ rules that that reference the feature properties or behaviors to define the conditions for determining context (e.g., to resolve or relate entities).

Figure 1:
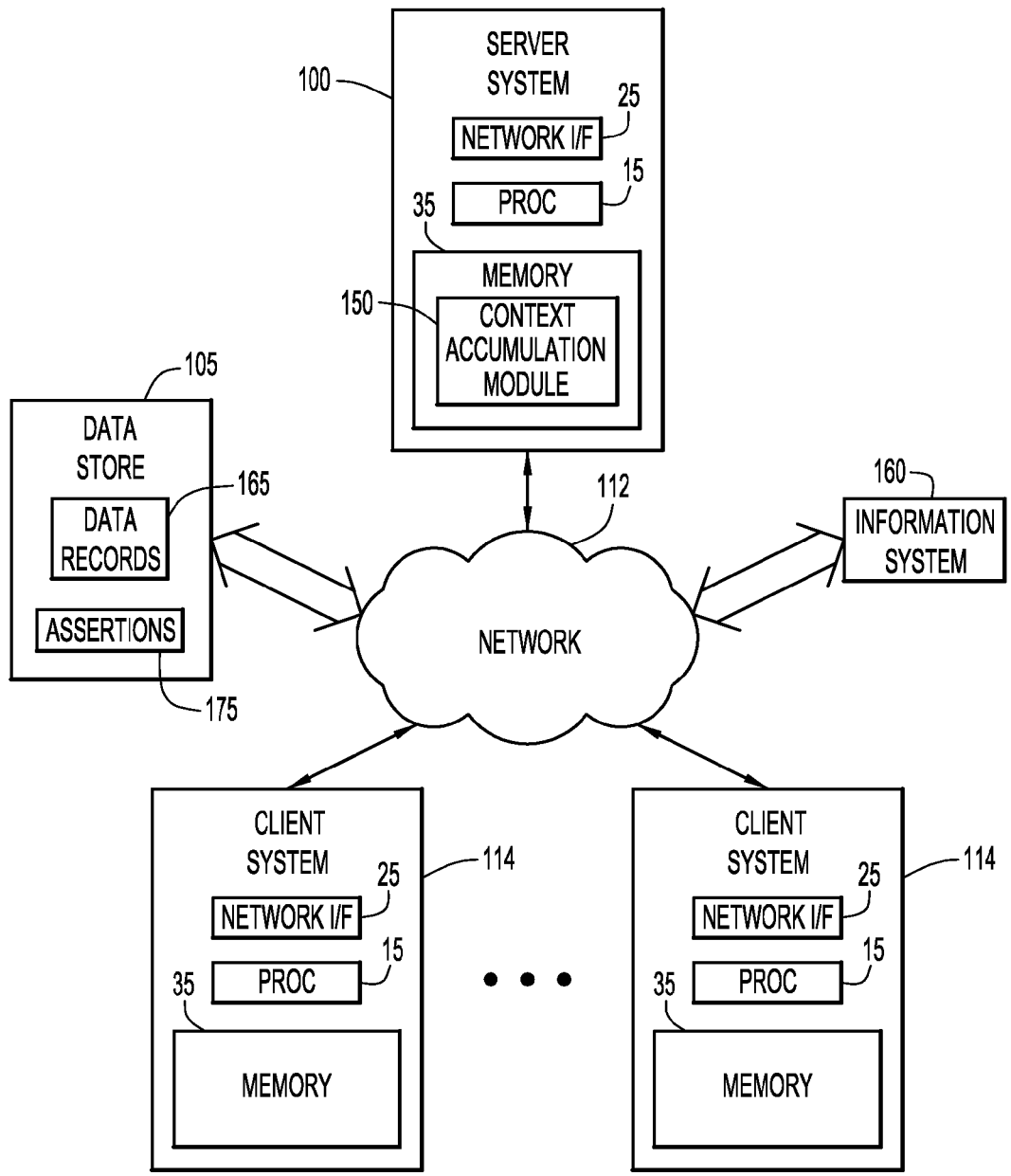
FIG. 1 is a diagrammatic illustration of an example computing environment according to an embodiment of the present invention.

An example computing environment or system for performing context accumulation according to an embodiment of the present invention is illustrated in FIG. 1. Specifically, the environment includes one or more server systems 100, one or more client systems 114, and one or more information systems 160. Server systems 100, client systems 114, and information systems 160 may be remote from each other and communicate over a network 112. The network may be implemented by any number of any suitable communications media (e.g., wide area network (WAN), local area network (LAN), Internet, Intranet, etc.). Alternatively, server systems 100, client systems 114, and information systems 160 may be local to each other, and communicate via any appropriate local communication medium (e.g., local area network (LAN), hardwire, wireless link, Intranet, etc.).

Client systems 114 enable users to provide information to server systems 100 to query or ascertain information. Client systems 114 may present a graphical user (e.g., GUI, etc.) or other interface (e.g., command line prompts, menu screens, etc.) to solicit information from and provide information to users pertaining to context accumulation and requested data (e.g., resolved entities, data records or information of those entities, etc.).

Server systems 100 associate various data records with common entities as described below, and provide information pertaining to entities in response to requests from the client systems. The server systems include a context accumulation module 150 to associate data with common entities. The context accumulation module may further process requests for entity information. A data store 105 may store various information for context accumulation (e.g., data records, entities, data records associated with each entity, features, behaviors, etc.). The data store includes data records 165 each with various features or characteristics pertaining to a corresponding entity. Further, the data store includes properties or behaviors for the various features. The feature properties may be provided with the data records, may be determined based on the features of the data records, and/or may be pre-loaded. Data records 165 may contain information received from one or more information systems 160. For example, information for the data records may be provided by various systems (e.g., sensor systems, information collection systems, transaction systems, etc.). The provided information includes various features pertaining to a corresponding entity, and may further include the properties or behaviors for those features. Data records 165 basically represent collections of information for various entities that are processed to determine the data records associated with common entities.

Data store 105 includes one or more entities (e.g., person, animal, business, object, etc.) that are each represented by a corresponding set of associated data records 165. The data store further includes information pertaining to assertions 175 that indicate a determined entity for the associated data records. The data records associated with a common entity are determined (e.g., via server system 100 and context accumulation module 150) and associated or otherwise linked in the data store. This may be accomplished by each data record 165 including a record identifier and a unique entity identifier that identifies a corresponding entity for that data record. The sets of associated data records represent assertions 175 that the data records within each set are associated with a common corresponding entity. In other words, an assertion indicates a corresponding entity for a data record.

Data store 105 may be implemented by any conventional or other database or storage unit, may be local to or remote from server systems 100, client systems 114, and information systems 160, and may communicate via any appropriate communication medium (e.g., local area network (LAN), wide area network (WAN), Internet, hardwire, wireless link, Intranet, etc.).

Information systems 160 may provide various information or data records 165, and may include any suitable type of system or device that provides the information (e.g., database system, transaction or other computer system, sensor system, healthcare system, etc.). Server systems 100 (e.g., via context accumulation module 150) receive the information or data records from information systems 160, store the data records in data store 105, and determine the entities for the information as described below. The information or data records are subsequently conjoined with those determined entities. In the event an entity does not exist within the data store for a data record, a new entity is created for that data record.

Server systems 100 and client systems 114 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, context accumulation module, applications, browser/interface software, etc.).

Alternatively, one or more client systems 114 may perform context accumulation when operating as a stand-alone unit. In a stand-alone mode of operation, a client system stores or has access to information for context accumulation (e.g., data records, entities, data records associated with each entity, features, behaviors, etc.), and includes context accumulation module 150 to perform the context accumulation. The client system may present a graphical user (e.g., GUI, etc.) or other interface (e.g., command line prompts, menu screens, etc.) to solicit information from and provide information to a corresponding user pertaining to the context accumulation, and may provide reports including query and/or analysis results (e.g., related entities, associated data records, etc.).

Context accumulation module 150 may include one or more modules or units to perform the various functions of present invention embodiments described below. The various modules (e.g., context accumulation module, etc.) may be implemented by any combination of any quantity of software and/or hardware modules or units, and may reside within memory 35 of the server and/or client systems for execution by processor 15.

Figure 2A:
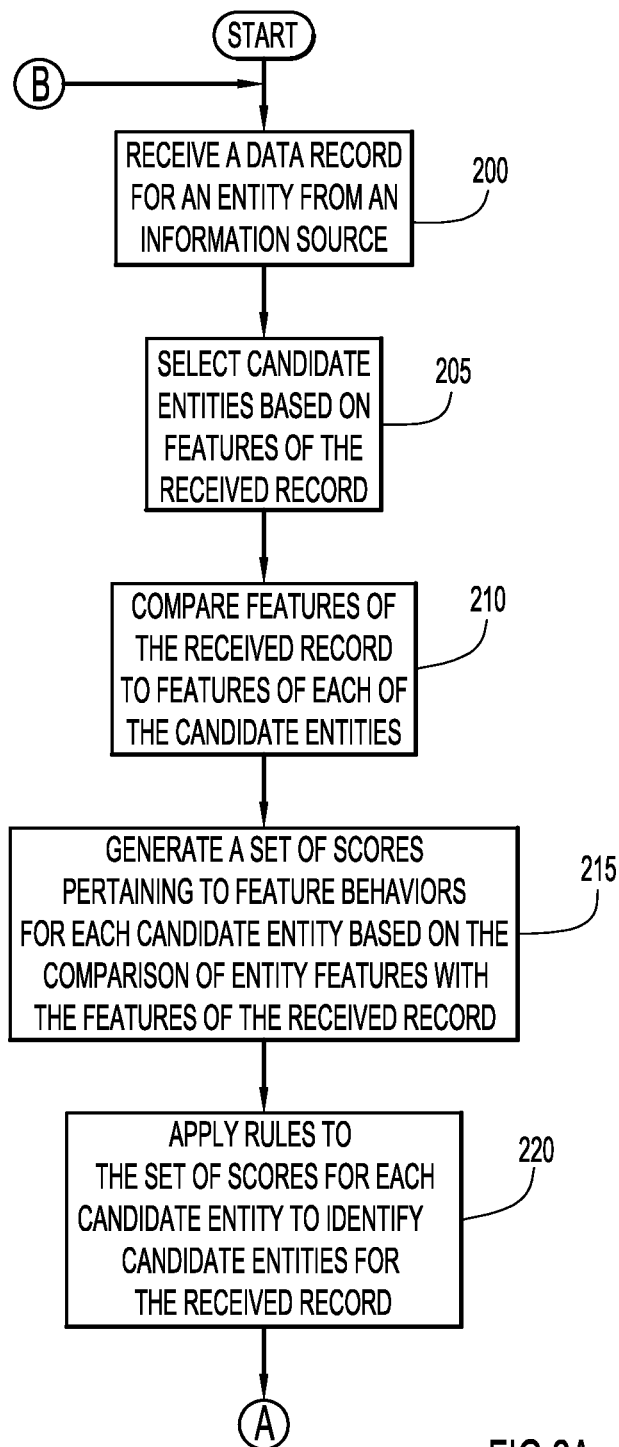
FIGS. 2A-2B are a procedural flowchart illustrating the manner in which related entities are determined based on properties or behaviors of entity features according to an embodiment of the present invention.
Figure 2B:
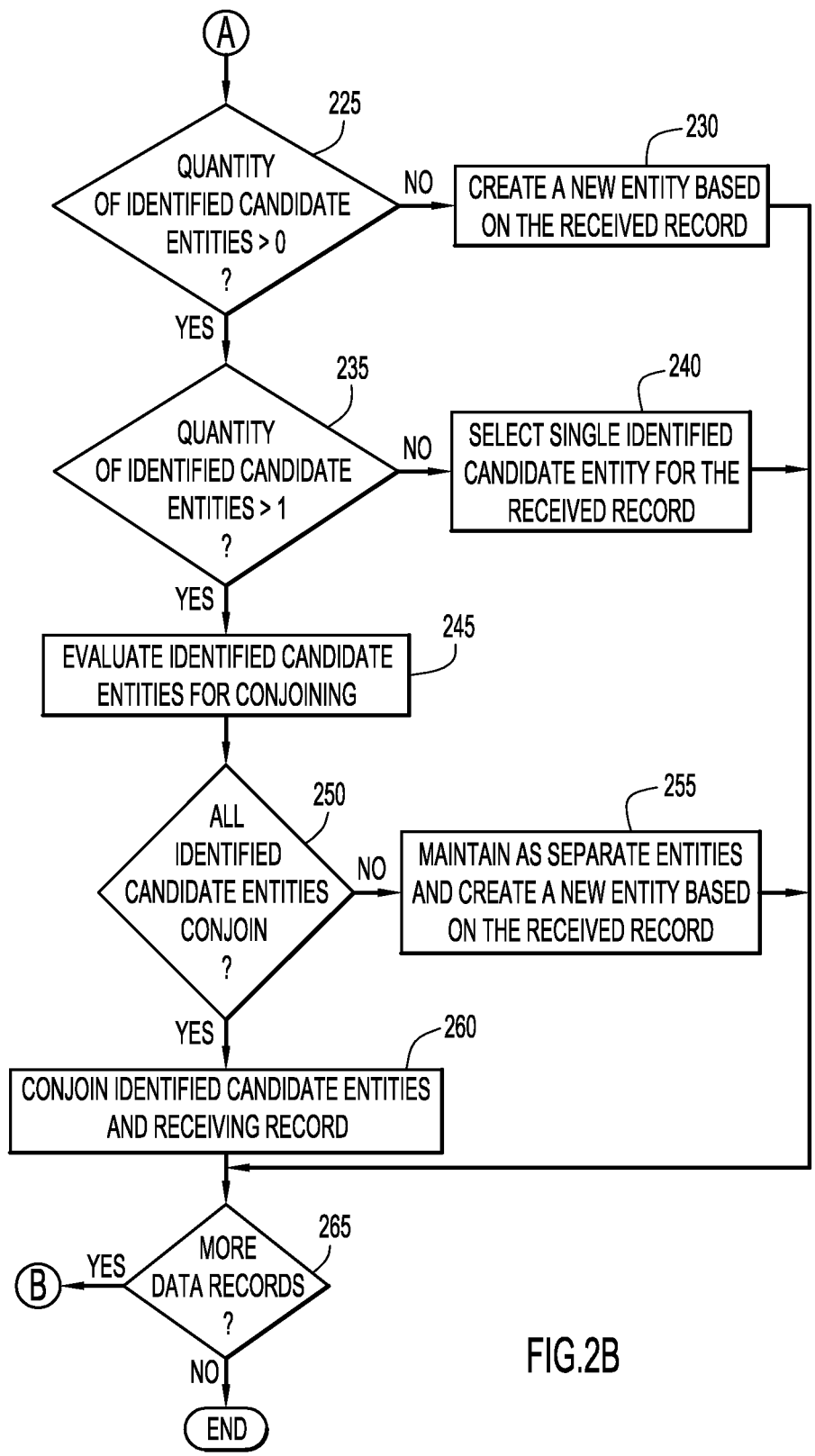

A manner of performing context accumulation (e.g., via a server system 100 and/or client system 114 and context accumulation module 150) according to an embodiment of the present invention is illustrated in FIGS. 2A-2B. Initially, data store 105 includes one or more entities (e.g., person, animal, business, object, etc.) that are each represented by a corresponding set of associated data records, and information pertaining to assertions 175 for those data record sets indicating corresponding determined entities. In particular, a data record is received from an information source (e.g., an information system 160) at step 200 (FIG. 2A). The data record includes various features or characteristics pertaining to a corresponding entity, while the features are associated with various properties or behaviors as described below. The received data record may be transformed to a format compatible with data store 105 and subsequently stored.

A set of candidate entities for the received data record is determined at step 205. This may be accomplished by comparing features of the received data record with features of the data records for each entity residing within data store 105 utilizing various conventional or other matching techniques. For example, exact or partial matches between features of the received data record and the sets of data records for the entities may be performed. Further, hashes of the received data record and the sets of data records for the entities may be compared.

Once the set of candidate entities is determined, the features of the received data record are compared with corresponding features of the data records of each of the candidate entities at step 210. A set of scores for properties or behaviors of the compared features is generated for each candidate entity at step 215. Basically, properties or behaviors of features of the data records of each candidate entity are scored to produce an overall summary of feature property scores for that candidate entity. Context accumulation rules may be produced based on this summary of generalized feature property scores to accurately associate data records and relate entities as described below.

By way of example, feature properties or behaviors may include frequency, exclusivity, and stability. The frequency property or behavior pertains to the quantity of entities that should have the corresponding feature. By way of further example, the frequency property or behavior is associated with the following frequency indications for a corresponding feature: frequency one (F1), frequency few (FF), frequency many (FM), and name. The frequency one (F1) indication indicates that only one entity should have the corresponding feature, while the frequency few (FF) indication indicates that only a few entities should have the corresponding feature. The frequency many (FM) indication indicates that many entities should have the corresponding feature.

The name indication indicates a scenario where frequency is tied to an actual name. For example, some names are common (e.g., John, Jessica, etc.), while other names are substantially unique. Name features are assigned this indication in order to be referenced in resolution rules as described below (e.g., indicating the commonality or uniqueness of a name).

The exclusivity property or behavior pertains to the quantity of the corresponding feature an entity should contain, while the stability property or behavior pertains to whether or not the value for the corresponding feature changes during the existence of the entity. By way of example, the exclusivity and stability feature properties or behaviors are associated with values that indicate the presence or absence of these properties (e.g., Yes/No to indicate the presence or absence of exclusivity and stability for a feature).

An example summary of feature property scores for a candidate entity is shown below in Table I.

TABLE I

| | SAME | CLOSE | LIKE-LY | PLAU-SIBLE | UN-LIKE-LY | NO CHANCE |
|---|---|---|---|---|---|---|
| NAME | # | # | # | # | # | # |
| F1 | # | # | # | # | # | # |
| FF | # | # | # | # | # | # |
| FM | # | # | # | # | # | # |
| EXCLU-SIVE | # | # | # | # | # | # |
| STABLE | # | # | # | # | # | # |
| ES | # | # | # | # | # | # |
| F1E | # | # | # | # | # | # |
| F1ES | # | # | # | # | # | # |
| FFE | # | # | # | # | # | # |
| FFES | # | # | # | # | # | # |
| FME | # | # | # | # | # | # |
| FMES | # | # | # | # | # | # |

Each row of Table I provides information for a corresponding property or behavior of the features for the candidate entity (or associated data records thereof) and corresponding combinations of those properties. For example, the rows of Table I include values for the indications for the frequency property or behavior (e.g., name, frequency one (F1), frequency few (FF), frequency many (FM)), values for the exclusive property or behavior, and values for the stability property or behavior. The rows of Table I further include various combinations of these properties or behaviors (e.g., exclusive and stable (ES); frequency one and exclusive (F1E); frequency one, exclusive, and stable (F1ES); frequency few and exclusive (FFE); frequency few, exclusive, and stable (FFES); frequency many and exclusive (FME); and frequency many, exclusive, and stable (FMES)).

The columns of Table I indicate a degree of similarity or likeness (e.g., SAME, CLOSE, LIKELY, PLAUSIBLE, UNLIKELY, NO_CHANCE) between the features of the received data record and the features of a data record of a candidate entity. The values within Table I (e.g., '#' as viewed in Table I) represent the quantity of features within the compared candidate entity records that have the corresponding behaviors or combination of behaviors indicated by the rows of Table I.

In particular, a feature of the received data record is compared to the corresponding feature of an associated data record of a candidate entity, and a matching score (e.g., in the range of 0-100) is determined. This may be accomplished by any conventional or other matching techniques (e.g., matching, partial matching, matching of hash values, etc.). Each column (e.g., SAME, CLOSE, LIKELY, PLAUSIBLE, UNLIKELY, NO_CHANCE) of Table I is associated with a corresponding matching score threshold (e.g., SAME may indicate a match of the corresponding features (e.g., a matching score equal to 100), CLOSE may indicate a substantial match of the corresponding features (e.g., a matching score less than 100, but greater than or equal to 90), LIKELY may indicate a probable match of the corresponding features (e.g., a matching score less than 90, but greater than or equal to 80), PLAUSIBLE may indicate a possible match of the corresponding features (e.g., a matching score less than 80, but greater than or equal to 50), UNLIKELY indicates an improbable match between corresponding features (e.g., a matching score less than 50, but greater than or equal to 10), NO_CHANCE indicates a mismatch between corresponding features (e.g., a matching score less than 10)). The resulting matching score determines the column within Table I to receive values based on the associated matching score thresholds (e.g., a matching score of 95 may indicate the CLOSE column to receive values for behaviors of a feature of a candidate entity record). The value for the corresponding behaviors and combination of behaviors in the table rows are incremented within the determined column (e.g., CLOSE in the example scenario) based on the association of those behaviors or combination of behaviors with the feature being compared (e.g., the corresponding features of the received data record and candidate entity generally have the same or similar behaviors).

For example, a feature of the received data record is compared to a corresponding feature of an associated data record of a candidate entity to determine a matching score. The resulting matching score is utilized to determine the appropriate column to receive or increment values for the feature of the associated candidate entity record based on the behaviors present within that feature. For each behavior or combination of behaviors in the table rows, the corresponding quantity for the determined column is incremented in response to a feature of a candidate entity data record being associated with that behavior. Each feature of the received data record is compared to corresponding features of each associated data record of a candidate entity to generate a feature property score summary (e.g., Table I) for each candidate entity.

Once the feature property score summary for each candidate entity has been determined, general or universal rules are applied to the feature property score summary of each candidate entity at step 220 to determine or identify the candidate entities for the received data record. The general rules reference the feature property scores within the feature property score summaries, and specify conditions for identifying a candidate entity for the received data record. When a candidate entity (or corresponding feature property score summary) satisfies a rule, the candidate entity is deemed to be identified for the received data record. The rules may be predetermined, and may further be modified by a user.

Example rules referencing information within Table I may be as follows.

NAME[SAME]>=1 AND F1[SAME]>=1 AND EXCLUSIVE[NO_CHANCE]=0

In this case, the rule indicates that a candidate entity may be identified for a received data record when one or more matching features between the received data record and records of the candidate entity have a name frequency behavior, one or more matching features between the received data record and records of the candidate entity have a frequency one (F1) frequency behavior, and no unmatched features between the received data record and records of the candidate entity are exclusive.

NAME[SAME]>=1 AND F1[SAME]>=1 AND EXCLUSIVE[NO_CHANCE]>0

This rule indicates that a candidate entity may be identified for a received data record when one or more matching features between the received data record and records of the candidate entity have a name frequency behavior, one or more matching features between the received data record and records of the candidate entity have a frequency one (F1) frequency behavior, and at least one unmatched feature between the received data record and records of the candidate entity is exclusive. The conditions for the rules may be validated based on the quantity counts or values within the feature property score summary (Table I) for the candidate entity.

In addition, the rules may further include conditions for specific features of an entity. An example rule with specific features may be as follows.

NAME[SAME]>=1 AND FF[SAME]>=1 AND DOB[CLOSE OR SAME]>=1

In this case, the rule indicates that a candidate entity may be identified for a received data record when one or more matching features between the received data record and records of the candidate entity have a name frequency behavior, one or more matching features between the received data record and records of the candidate entity have a frequency few (FF) frequency behavior, and there are one or more matching or closely matching date of birth (DOB) features between the received data record and records of the candidate entity. These conditions may be validated based on the quantity counts or values within the feature property score summary (Table I) for the candidate entity, and values for the features of the candidate entity (or associated data records).

When none of the candidate entities are identified for the received data record as determined at step 225 (FIG. 2B), a new entity is created based on the received data record at step 230. In this case, a new entity identifier is determined and assigned to the received data record, and information pertaining to the new entity (e.g., including an assertion 175 that the received data record corresponds to the newly created entity) is stored in data store 105.

If a single candidate entity is identified for the received data record as determined at steps 225 and 235, the received data record is conjoined with the identified candidate entity at step 240. In this case, the received data record is assigned the entity identifier for the identified candidate entity, and information pertaining to the modified entity (e.g., including an assertion 175 that the received data record corresponds to the identified candidate entity) is stored in data store 105.

When two or more candidate entities are identified for the data record as determined at steps 225 and 235, the identified candidate entities are evaluated at step 245 to determine the presence of a common entity among the candidate entities. In other words, the candidate entities are evaluated to determine the presence of conditions for conjoining the candidate entities into a common entity. This may be accomplished by comparing features of associated data records of a first candidate entity to features of associated data records of a second candidate entity, and generating a feature property score summary for the second candidate entity in substantially the same manner described above. Rules may be applied to the feature property score summary to determine conjoining of the first and second candidate entities. A feature property score summary is determined for a subsequent candidate entity based on feature comparisons with the conjoined first and second candidate entities, and rules are applied to determine conditions for conjoining the subsequent candidate entity with the conjoined first and second candidate entities. This process is repeated for each subsequent candidate entity identified for the received data record (e.g., at step 220).

If all of the candidate entities identified for the received data record can be conjoined as determined at step 250, the identified candidate entities and received data record are conjoined into a common entity at step 260. In this case, each of the associated data records of the candidate entities and the received data record are assigned the entity identifier of the common entity (e.g., the identifier of one of the candidate entities), and information pertaining to the modified entity (e.g., including an assertion 175 that the associated data records of the candidate entities and the received data record correspond to the common entity) is stored in data store 105.

When all of the candidate entities identified for the received data record cannot be conjoined as determined at step 250, the identified candidate entities and received data record are maintained as separate entities at step 255. A new entity is created for the received data record. In this case, a new entity identifier is determined and assigned to the received data record, and information pertaining to the new entity (e.g., including an assertion 175 that the received data record corresponds to the newly created entity) is stored in data store 105 in substantially the same manner described above.

The above process is repeated until each received data record has been processed as determined at step 265.

The above process may be further utilized for entity resolution (e.g., to conjoin entities into a common entity) in response to modifications of features within data records, receiving new data or data records, and/or creation of new entities. Further, the above process may be performed at any desired periodic time intervals (e.g., hours, days, etc.) to resolve entities for data integrity. In these cases, new or modified data records and/or the data records associated with entities are utilized to generate feature property score summaries for candidate entities, and rules are applied to the feature property score summaries to determine the presence of conditions suitable for conjoining in substantially the same manner described above. The entity resolution may further reverse earlier assertions with respect to associations of data records with entities.

In addition, context accumulation may be utilized to determine or modify feature behaviors. For example, a feature may initially be designated with a frequency behavior of frequency one (F1) (e.g., only a single entity should include this feature). However, performance of context accumulation may reveal statistics or information indicating other entities with this feature, thereby conflicting with the frequency one (F1) designation. Accordingly, present invention embodiments may modify the frequency behavior of the feature to a frequency few (FF) or frequency many (FM) behavior. In the case where behaviors are not designated for a feature, present invention embodiments may determine the behavior for the feature (e.g., based on statistics from context accumulation and/or feature comparisons).

It will be appreciated that the embodiments described above and illustrated in the drawings represent only a few of the many ways of implementing embodiments for performing context accumulation based on properties of entity features.

The computing environment or system for the present invention embodiments may include any number of computer or other processing systems (e.g., client systems, server systems, information systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, context accumulation module, etc.). These systems may include any types of monitors and input devices (e.g., keyboard, mouse, voice recognition, etc.) to enter and/or view information. In addition, the computer systems may host any quantity of any physical or virtual servers.

It is to be understood that the software (e.g., context accumulation module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., context accumulation module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The computing environment or system may employ any number of any conventional or other databases, data stores, or storage structures (e.g., files, databases, data structures, data or other repositories, etc.) to store any desired information (e.g., entities, assertions, data records, etc.). The database systems and data stores may be implemented by any number of any conventional or other databases, data stores, or storage structures (e.g., files, databases, data structures, data or other repositories, etc.) to store any desired information. The database systems and data stores may be included within or coupled to the server, information, and/or client systems. The database systems and/or data stores may be remote from or local to the computer or other processing systems, and may store any desired data.

The information system may be of any quantity, and include any suitable type of system or device that provides information (e.g., database system, transaction or other computer system, sensor system, healthcare system, etc.). The information may be in any desired format or arrangement (e.g., raw data, data records or objects, etc.). The data records may be implemented by any type of data object containing data (e.g., record, file, data or storage structure, etc.), may include any desired arrangement or format, and may store any desired information.

An entity may represent any type of object (e.g., person, physical or virtual thing or object, animal, business type entity (e.g., company, corporation, partnership, etc.), profession, etc.). An entity may include or be associated any quantity of any type of features or characteristics. A feature may include or be associated with any quantity of any types of properties or behaviors (e.g., frequency, exclusivity, stability, etc.). The behaviors may include any quantity of any types of indications to provide an indication of the behavior (e.g., yes/no, value, etc.). An entity may be associated with any quantity of data records or objects, where the associated data records or objects may be linked in any desired fashion to indicate a common entity (e.g., identifiers, pointers, links, etc.). Further, two or more entities may be conjoined, associated, or otherwise consolidated in any desired fashion to represent a common entity, where the data records associated with the two or more entities may be linked in any desired fashion to indicate the common entity (e.g., identifiers, pointers, links, etc.). The entity identifier may include any quantity of any types of characters (e.g., alphanumeric, symbols, etc.) and be generated in any fashion.

Any suitable conventional or other matching techniques may be employed to determine candidate entities and/or similarities between features (e.g., partial and/or exact matching, matching of hashes, etc.). A threshold for selection of candidate entities based on matching may be set to any desired value (e.g., a certain match percentage, a confidence score threshold, etc.). The matching score between features may be within any desired range.

The feature property score summary may include any quantity of matching score ranges (e.g., columns of example Table I with any desired labels), and any quantity of feature behaviors and/or combinations of feature behaviors (e.g., rows of example Table I with any desired labels). For example, the feature property score summary of example Table I may alternatively include SAME, CLOSE, and DIFFERENT matching score ranges (where the DIFFERENT matching score range includes the matching score ranges of LIKELY, PLAUSIBLE, UNLIKELY, and NO_CHANCE described above). The feature behaviors may be utilized individually or in any combinations within the feature property score summary. The values for the feature property score summary may be of any values, and may be incremented or decremented in any fashion (e.g., by any increment or decrement, etc.).

In addition, any quantity of features (or any portions thereof) of entities may be combined in any fashion to generate a new feature with a different behavior (e.g., plural features with frequency behavior indications of frequency many (FM) may be combined to produce a feature with a frequency behavior indication of frequency few (FF) or frequency one (F1)). For example, the combination of features of a person name, one or more parent's names (father and/or mother), and their respective dates of birth may produce a new feature. The new feature may have a frequency behavior indication of frequency one (F1), whereas the individual features may each have a frequency behavior indication (e.g., frequency many (FM), etc.) different than the new feature (e.g., frequency one (F1), etc.). This is useful for matching data sets with sparse data (e.g., a combination of features may be utilized to produce a new behavior for a data set).

The rules may be of any quantity, format or arrangement, and may reference any quantity of features, behaviors or other items (e.g., time conditions, etc.). Any quantity of rules may be applied to a feature property score summary and combined in any fashion to determine a common entity. The rules may be applied to the feature property score summary to indicate any types of related entities (e.g., common or identical entities, entities that are related or have related attributes (without conjoining), etc.).

In the event two or more candidate entities are identified for a data record or another entity, any conventional or other techniques may be utilized to select a best entity for conjoining with the data record or entity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for conjoining entities comprising:
   identifying a candidate entity associated with one or more features based on one or more features associated with an entity, wherein each of the one or more features of the candidate entity and each of the one or more features of the entity is associated with behaviors consisting of a frequency behavior indicating a quantity of entities of a plurality of entities having a corresponding feature and an exclusivity behavior indicating a quantity of the corresponding feature entities of the plurality of entities have;
   determining, for each feature of the candidate entity, a feature property score that represents a degree of similarity between the behaviors of that feature of the candidate entity and the behaviors of that feature of the entity;
   applying rules to each feature property score of the candidate entity, wherein each rule of the rules specifies a threshold of a particular degree of similarity in conjunction with one or more behaviors; and
   in response to applying the rules, conjoining the candidate entity and the entity to form a conjoined entity by assigning a common entity identifier to each of one or more data records associated with the candidate entity and to each of one or more data records associated with the entity.

2. The computer-implemented method of claim 1, further comprising:
   modifying a value of one of the behaviors of the entity based on statistics.

3. The computer-implemented method of claim 1, wherein the behaviors further consist of a stability behavior indicating whether a value for the corresponding feature changes for the entity.

4. The computer-implemented method of claim 1, further comprising:
   combining two or more features of the entity to produce a new feature with a new behavior for the entity.

5. The computer-implemented method of claim 1, wherein the degree of similarity is any one of: same, close, likely, plausible, unlikely, and no chance.

6. A system for conjoining comprising:
   at least one processor configured to:
   identifying a candidate entity associated with one or more features based on one or more features associated with an entity, wherein each of the one or more features of the candidate entity and each of the one or more features of the entity is associated with behaviors consisting of a frequency behavior indicating a quantity of entities of a plurality of entities having a corresponding feature and an exclusivity behavior indicating a quantity of the corresponding feature entities of the plurality of entities have;
   determining, for each feature of the candidate entity, a feature property score that represents a degree of similarity between the behaviors of that feature of the candidate entity and the behaviors of that feature of the entity;
   applying rules to each feature property score of the candidate entity, wherein each rule of the rules specifies a threshold of a particular degree of similarity in conjunction with one or more behaviors; and
   in response to applying the rules, conjoining the candidate entity and the entity to form a conjoined entity by assigning a common entity identifier to each of one or more data records associated with the candidate entity and to each of one or more data records associated with the entity.

7. The system of claim 6, wherein the at least one processor is further configured to:
   modify a value of one of the behaviors of the entity based on statistics.

8. The system of claim 6, wherein the behaviors further consist of a stability behavior indicating whether a value for the corresponding feature changes for the entity.

9. The system of claim 6, further comprising:
   combining two or more features of the entity to produce a new feature with a new behavior for the entity.

10. The system of claim 6, wherein the degree of similarity is any one of: same, close, likely, plausible, unlikely, and no chance.

11. A computer program product for conjoining entities comprising:
- a non-transitory computer readable storage medium having computer readable program code embodied therewith, the computer readable program code comprising computer readable program code configured to:
- identifying a candidate entity associated with one or more features based on one or more features associated with an entity, wherein each of the one or more features of the candidate entity and each of the one or more features of the entity is associated with behaviors consisting of a frequency behavior indicating a quantity of entities of a plurality of entities having a corresponding feature and an exclusivity behavior indicating a quantity of the corresponding feature entities of the plurality of entities have;
- determining, for each feature of the candidate entity, a feature property score that represents a degree of similarity between the behaviors of that feature of the candidate entity and the behaviors of that feature of the entity;
- applying rules to each feature property score of the candidate entity, wherein each rule of the rules specifies a threshold of a particular degree of similarity in conjunction with one or more behaviors; and
- in response to applying the rules, conjoining the candidate entity and the entity to form a conjoined entity by assigning a common entity identifier to each of one or more data records associated with the candidate entity and to each of one or more data records associated with the entity.

12. The computer program product of claim 11, wherein the computer readable program code further comprises computer readable program code configured to:
- modify a value of one of the behaviors of the entity based on statistics.

13. The computer program product of claim 11, wherein the behaviors further consist of a stability behavior indicating whether a value for the corresponding feature changes for the entity.

14. The computer program product of claim 11, further comprising:
- combining two or more features of the entity to produce a new feature with a new behavior for the entity.

15. The computer program product of claim 11, wherein the degree of similarity is any one of: same, close, likely, plausible, unlikely, and no chance.

* * * * *